Nov. 23, 1954  J. M. UNK ET AL  2,695,089
AUTOMATIC OVERLOAD-RELEASE CLUTCH MECHANISM
Filed Nov. 21, 1950  4 Sheets-Sheet 2

INVENTORS
JACOB MARINUS UNK
NICOLAAS SCHEFER
BY
AGENT

Nov. 23, 1954  J. M. UNK ET AL  2,695,089
AUTOMATIC OVERLOAD-RELEASE CLUTCH MECHANISM
Filed Nov. 21, 1950  4 Sheets-Sheet 3

INVENTORS
JACOB MARINUS UNK
NICOLAAS SCHEFFER
BY
AGENT

Nov. 23, 1954 J. M. UNK ET AL 2,695,089
AUTOMATIC OVERLOAD-RELEASE CLUTCH MECHANISM
Filed Nov. 21, 1950 4 Sheets-Sheet 4

INVENTOR.
JACOB MARINUS UNK
NICOLAAS SCHEFFER
BY
AGENT

United States Patent Office 2,695,089
Patented Nov. 23, 1954

2,695,089

AUTOMATIC OVERLOAD-RELEASE CLUTCH MECHANISM

Jacob Marinus Unk and Nicolaas Scheffer, Hilversum, Netherlands, assignors to Hartford National Bank and Trust Company, Hartford, Conn., as trustee Application November 21, 1950, Serial No. 196,814

Claims priority, application Netherlands December 17, 1949

19 Claims. (Cl. 192—150)

This invention relates to automatic overload-release clutch mechanisms between a driving shaft and a driven shaft.

Mechanisms of this kind are known in which the motive power is transferred with the use of an auxiliary member connected by means of one or more springs to the output part of the mechanism, i. e., the part between the driven shaft and the auxiliary member, so that in case of overload the auxiliary member and the output part are rotated relative. The auxiliary member furthermore carries a movable coupling pawl which constitutes a coupling between the auxiliary member and the input part of the mechanism, i. e., the part between the driving shaft and the auxiliary member, which pawl is capable of being engaged or disengaged and which is controlled as a function of relative rotation of the auxiliary member and the outgoing part. In order to permit automatic switching, the clutch mechanism comprises a locking coupling which, after the coupling pawl has been made inoperative, couples the auxiliary member to a locking body carried by a stationary part of the mechanism. This locking coupling prevents the auxiliary member from moving back under the action of the spring or springs connecting this member to the output part and thus the coupling pawl from being again actuated while the output part is still overloaded. The object of the invention is to provide an alternative coupling mechanism which offers advantages with respect to the known mechanisms.

According to the invention, an automatic overload-release clutch mechanism, between a driving shaft and a driven shaft, is characterized in that the motive power is transmitted by means of a displaceable master wheel which continuously meshes with an outgoing wheel provided on the driven shaft and which is connected to the driving shaft by way of a coupling capable of being engaged and disengaged, said master wheel owing to the driving moment transmitted to it by way of this coupling and its permanent engagement with the outgoing wheel, upon overload of the driven shaft being displaced against the action of a force to return to its initial position by the action of said force when the overload is removed, provision being made of means by which the displacement of the master wheel is transferred to the parts to be moved for causing engagement and disengagement of the coupling provided in the connection with the driving shaft, and furthermore means being provided which, when the last-mentioned coupling is disengaged, prevent rotation of the master wheel in a sense opposite to the rotational movement followed by this wheel prior to overload.

The clutch mechanism according to the invention affords the advantage of a compact structure, while the number of parts which remain rotating after disengagement is small. The construction affords the additional advantage that the force against which the master wheel is displaced upon overload and which ensures that the connection with the driving shaft is restored when the overload is removed, may be provided by stationary means so that the value of the force may readily be varied and said means may be contained in a small volume. The force may be obtained, for example, with the use of a mass subject to gravity or any other attractional force. The force may advantageously be provided by a spring, hereinafter referred to as the main spring, which is connected to a fixed part of the mechanism.

The control means for the disengageable coupling included in the connection between the driving shaft and the master wheel, the state of which control means is determined by the position of the master wheel, may advantageously be such that the coupling operates with retardation, that is to say only after initial displacement of the master wheel. This mechanical hysteresis prevents coupling in the connection with the driving shaft, from re-engaging during continued overload on the driven shaft, immediately after interruption of the connection, so that repeated disengagement and engagement in consequence of a small return movement of the master wheel owing to play between the various parts of the mechanism, is avoided.

The coupling in the connection between the driving shaft and the master wheel may be constituted by a displaceable coupling wheel which may be caused by displacement to engage or to disengage an input wheel on the driving shaft. Said coupling wheel may be coupled to the master wheel by way of a rotary gear wheel (intermediate wheel) arranged in a fixed position in the mechanism, the shaft of the master wheel being supported in a movable part which is adapted to be displaced in a direction substantially at right angles to the longitudinal direction of the shaft of the intermediate wheel.

The master wheel and the output wheel may have inclined teeth, the direction in which the master wheel moves upon non-corresponding rotation of the two wheels, coinciding with the longitudinal direction of the shaft of the master wheel. The direction of displacement of the coupling wheel by which it is caused to engage or disengage the input wheel, may coincide with the longitudinal direction of the shaft of the coupling wheel. As an alternative, the shaft of the coupling wheel may be coupled with the shaft of the master wheel by way of a coupling which permits the shaft of the coupling wheel to swing in the transverse direction.

Since several of the parts of the mechanism perform a movement only for effecting engagement or disengagement and otherwise are stationary, the clutch mechanism according to the invention affords the advantage that several steps may be taken in a simple manner by which the speed at which the connection with the driving shaft is interrupted or restored is increased and which ensure that the coupling is switched from one position to the other very rapidly, that is to say cannot for any considerable time occupy a position in which the coupling parts only just contact with one another, which might lead to excessive wear and inaccurate operation. Furthermore, it is possible to take steps by which the coupling is engaged or disengaged with greatly differing displacements of the master wheel, with the result that the good operation is enhanced.

Short-period variations in the load on the driven shaft might have the effect of displacing the master wheel, but to a smaller extent than is required for disengaging the coupling. As the master wheel moves back, the driven shaft may acquire a speed higher than that corresponding to the speed imparted to the driven shaft only by the driving connection with the driving shaft. This may be undesirable for certain uses of the clutch mechanism.

This disadvantage may be obviated by providing that in the engaged position of the coupling wheel, return of any displacement of the master wheel is not possible. This may be ensured with the use of a coupling between the part carrying the master wheel and a stationary part of the mechanism, which coupling is operative in one direction only. This coupling does not prevent a movement of the master wheel by which the relative displacement of this wheel and the output wheel increases, but normally prevents a reverse displacement of the master wheel. The part carrying the coupling wheel co-operates with said coupling in such manner that in that position of the coupling wheel in which it disengages the input wheel, the part makes the said coupling inoperative. This is required since, after the coupling wheel has been disengaged, the master wheel upon the overload being removed must be capable of moving back in order to cause the coupling wheel to reengage, whereupon the coupling previously made inoperative is actuated and prevents a further return of the master wheel.

The clutch mechanism may be provided with one or more electrical contact devices which are actuated as a function of the state of the clutch mechanism. Said contact devices may fulfill, by electrical means, all kinds of functions such, for example, as signalling or alarming and controlling the driving mechanism of the driving shaft of the clutch mechanism. The contact devices may be coupled to the displaceable part carrying the coupling wheel so as to be actuated upon a movement of this part by which the coupling wheel is caused to engage or disengage the input wheel. The contact devices may comprise both break contacts and make contacts, no limitation being set to the number of the contacts.

The clutch mechanism according to the invention is particularly adapted for driving the movable part of a selector switch, for example, a selector in automatic telephone systems, from a continuously rotating shaft. When the movable part of the switch is stopped in any arbitrary contact position, this part immediately comes to a standstill and only then the driving connection with the continuously rotating shaft is interrupted due to the automatic operation of the clutch mechanism according to the invention. The time for disengaging the coupling mechanism is thus not included in the time for stopping the movable part of the switch so that a higher speed of this part may be admitted without a risk of incorrect stopping being involved.

The invention will now be explained more fully by reference to the accompanying diagrammatic drawings, given by way of example, in which Figs. 1 to 4 show an embodiment thereof in which a displaceable coupling wheel co-operating with a driving shaft is coupled by way of an intermediate wheel to the master wheel.

Figures 1, 2:
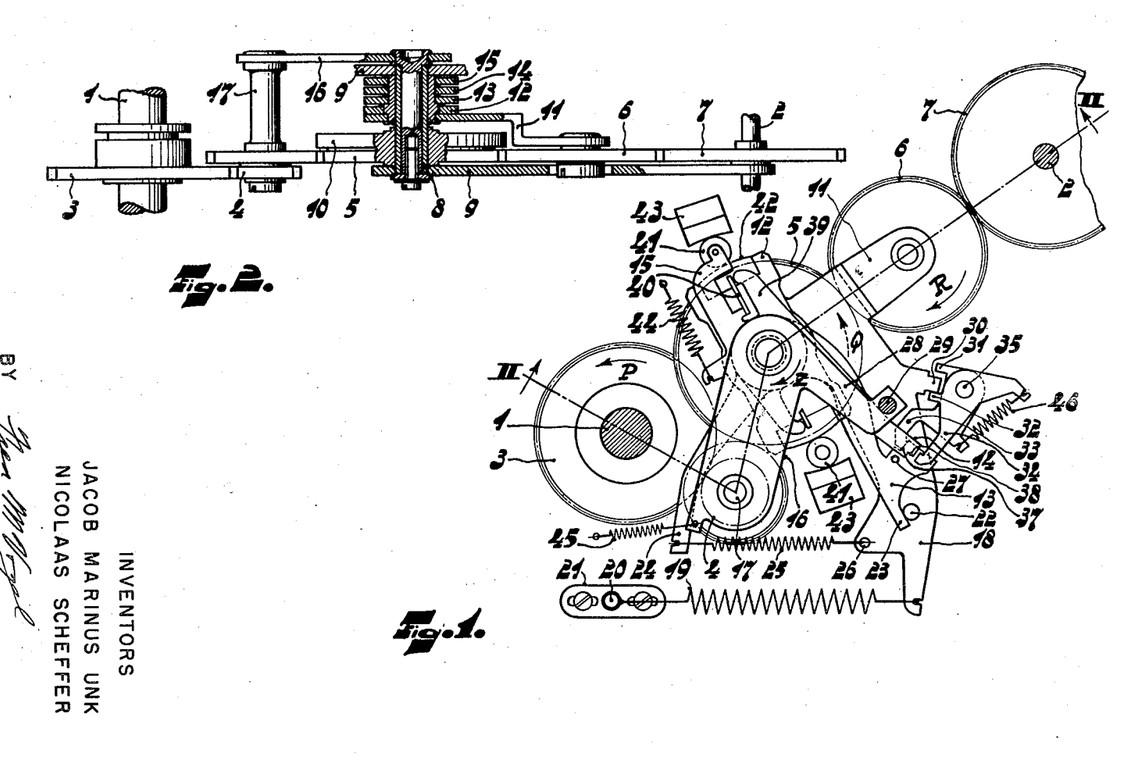
Fig. 1 is a plan view of the mechanism in the normal operating position.
Fig. 2 is a view taken on the line II—II of Fig. 1.
Figure 2A:
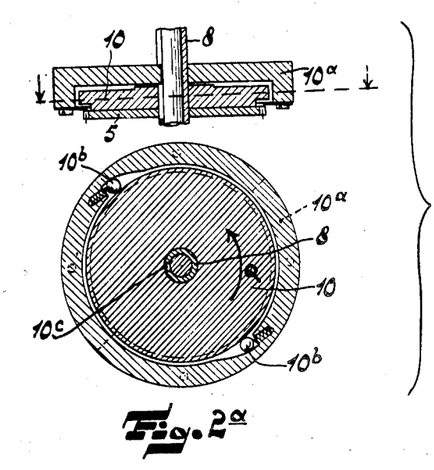
Fig. 2a is a vertical and horizontal sectional view of a part of the structure embodying our invention.

In the clutch mechanism shown in Figs. 1 to 4, the driving connection between a driving shaft 1 and a driven shaft 2 is constituted by a plurality of flat gear wheels, viz. 3 to 7, the shafts of which are parallel to one another. The gear wheel 3 is rigidly connected to the shaft 1 and constitutes the input wheel which meshes with a toothed rim of small diameter of a coupling wheel 4. A larger toothed rim of coupling wheel 4 meshes with an intermediate gear wheel 5. Gear wheel 5 engages a displaceable master wheel 6, which continuously meshes with an output wheel 7, rigidly connected to the driven shaft 2. The intermediate wheel 5 is rotatably supported by a hollow shaft 8, which furthermore carries a plurality of plate-shaped rotatable parts. The shaft 8 is rigidly connected to a plate-shaped frame 9 of the clutch mechanism. Connected to the gear wheel 5 is a cylindrical part 10, the edge of which is provided with recesses (not shown) the bottoms of which are inclined. The recesses accommodate balls adapted to co-operate with a stationary hollow cylindrical part (Fig. 2a). Fig. 2a shows a ball ratchet between the disc 10 and the frame of the device. Accordingly, the stationary part 10a of the ball ratchet in which part the balls 10b are housed is keyed to the hollow shaft 8 by means of keyway 10c in shaft 8. The part 10, together with the balls and the stationary part, constitute a one-way brake which is automatically operative in one sense of rotation. Provided above the wheel 5 and rotatable about the shaft 8 are respectively an arm 11, which carries the master wheel 6, a part 12, which is rigidly connected to the arm 11, and plate-shaped parts 13, 14 and 15. Provided at the extreme top of the shaft 8 is a rotatable arm 16, which carries a shaft 17, to which the coupling wheel 4 is rotatably secured. The arm 11, which rotatably supports the master wheel 6, has a (side) piece 18 having secured to it a main spring 19 the other extremity of which surrounds a stud 20. The latter is secured to a plate 21, which is provided with slotted holes and which is adustably secured to the plate-shaped frame 9 of the clutch mechanism with the use of screws extending through the slotted holes.

The side-piece 18 has an upwardly directed stud 22 with which a cam 23 of the plate-shaped part 13 co-operates. The plate-shaped part 13 comprises an arm 24, which is connected by means of a spring 25 to a stud 26 provided on the side-piece 18 of arm 11. Furthermore, the part 13 carries a stud 27 adapted to co-operate with the part 14.

The arm 16 which carries the shaft of the coupling wheel 4, has a part 28 on which a stud 29 is provided, which extends on the side opposite to stud 27 beside the part 14 so that upon rotation of the part 14 in anti-clockwise direction, the arm 16 is taken along and the coupling wheel 4 is caused to disengage from the input wheel 3.

The arm 11 has a cam 30, which is adapted to co-operate alternately with cams 31 and 32 of pawls 33 and 34. Said pawls are individually rotatable about a shaft 35 provided in the frame of the clutch mechanism.

The extremity of pawl 33 co-operates with the edges of a recess 37 provided in the part 13. The extremity of pawl 34 co-operates with the edge of a recess 38 in the part 14. Pawl 33 permits of blocking a movement of part 13 in anti-clockwise direction, pawl 34 permitting of blocking a movement of part 14 in a clockwise direction. The pawls 33 and 34 are interconnected by means of a spring 46, which urges the two pawls towards their operative positions.

The part 14 comprises two arms 39 arranged diametrically with reference to the intermediate wheel 5, each co-operating with a downwardly bent portion 40 of the part 15. The part 15, which is completely shown only in the upper part of Fig. 1, carries two clamping rollers 41, arranged diametrically with reference to and each engaging a cylindrical surface 42 extending coaxially with the intermediate wheel 5 and supported by the part 12 rigidly connected to the arm 11 and rotatable about the shaft. Furthermore, the rollers 41 are adapted to co-operate with fixed clamping blocks 43, each having a running surface for the rollers 41, which in the clockwise direction approaches the opposite cylindrical surface 42. The part 15 is maintained in the position shown in Fig. 1 by a spring 44, the clamping rollers 41 preventing rotation of the arm 11 and the part 12 in clockwise direction. Upon movement of part 14 in the anti-clockwise direction, as occurs upon overload, the part 15 is taken along by the arms 39 so that the clamping rollers 41 are moved out of their operative positions and the arm 11 is released.

The operation of the clutch mechanism is as follows. Fig. 1 shows the relative positions of the various parts in case of normal transmission of the motive power from the driving shaft to the driven shaft. The arm 11 is held against a stop (not shown) by the action of spring 25 in a position such that the centre of the master wheel 6 lies in the plane passing through the centre lines of the wheels 5 and 7. The arm 16 is urged by the action of a spring 45 in the direction shown by the arrow Z, that is to say in a clockwise direction, to such an extent that the coupling wheel 4 meshes with the input wheel 3. When the shaft 1 is driven in the direction shown by the arrow P, the intermediate wheel 5 and the master wheel 6 rotate in the directions shown by the arrows Q and R respectively. The automatically-operating clamping roller coupling (not shown) between the part 10 and a stationary part of the mechanism is inoperative for this sense of rotation of the intermediate wheel 5. The cam 30 of side-piece 18 keeps pawl 34 lifted, the extremity of pawl 33 being located in the recess 37 of part 13. In the position of part 14 shown in Fig. 1, its arms 39 disengage part 15, so that the clamping rollers 41 occupy their operative positions.

If the driven shaft 2 is overloaded, the master wheel 6, owing to its constrained rotation in the direction shown by the arrow R, will displace itself, together with the arm 11, in the direction opposite to that shown by the arrow Z about the shaft 8. The part 13 will have a tendency to follow the arm 11 due to the action of spring 25, but this is prevented by pawl 33. Finally, cam 30 of the moving arm 11 engages cam 31 on pawl 33 so that the latter is lifted. The part 13 is thus released and suddenly moves in a direction opposite to that shown by the arrow Z due to the action of spring 25, which has in the meantime been stretched, the part 14 being taken along by the stud 27. Since for this direction of movement the arm 16 is coupled by way of stud 29 to the part 14, the arm 16 is also taken along and the coupling wheel 4 is rapidly caused to disengage from the input wheel 3. Pawl 34 snaps into the recess 38 (Fig. 1) upon the displacement of part 14.

As soon as the coupling wheel 4 has been caused to disengage from the input wheel 3, the intermediate wheel 5 tends to move in a direction opposite to the direction shown by the arrow Q due to the movement exerted upon arm 11 by spring 19 and transferred to the intermediate wheel by the master wheel. However, this movement is prevented since the one-way brake (not shown) between the part 10 connected to the wheel 5 and a stationary part of the mechanism automatically becomes operative in this direction.

Figure 3:
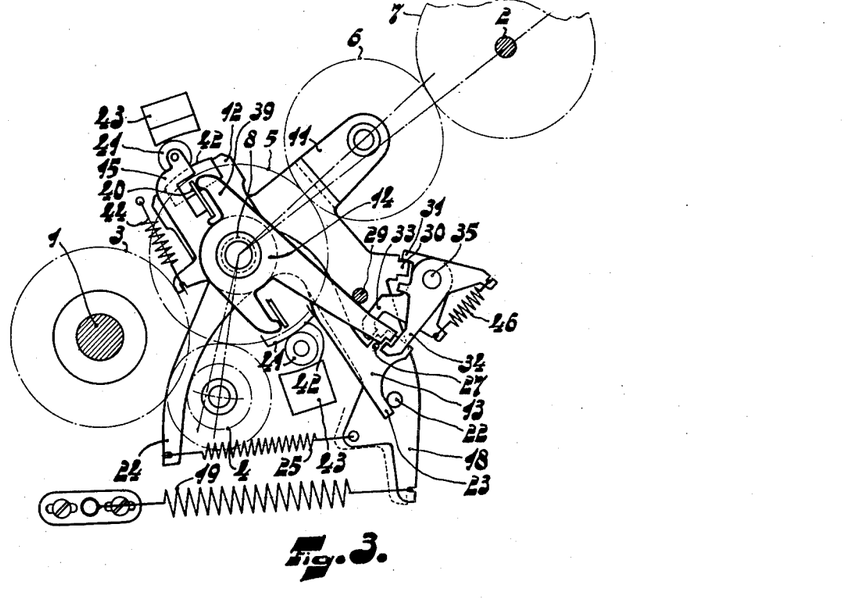
Figs. 3 and 4 are plan views of part of the clutch mechanism in a state differing from that in Fig. 1.

Fig. 3 shows in dotted lines the initial position of the extremity of side-piece 18. Owing to the movement of part 14, the arms 39 have turned part 15 about shaft 8 to such extent that the clamping rollers 41 are moved into their inoperative positions.

Figure 4:
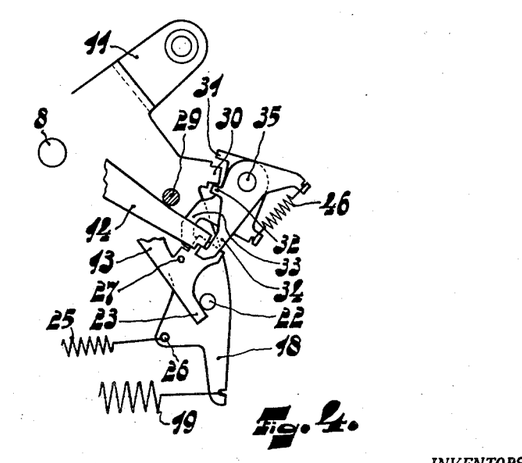

If, now, the overload on the driven shaft 2 is removed, shaft 2 together with the wheel will move in their normal senses of rotation under the action of the turning moment exerted upon arm 11 in the direction shown by the arrow Z by the main spring 19, master wheel 6 running over the intermediate wheel 5 locked against return movement, and arm 11 being moved back to its initial position. During this return movement of arm 11, the part 13 is taken along due to the co-operation between cam 23 and stud 22. The part 14 does not follow, however, this being prevented by pawl 34. Consequently, the coupling wheel 4 for the time being remains disengaged from the input wheel 3. Upon the return of arm 11, its cam 30 releases the cam 31 of pawl 33 so that after a certain return of arm 11 together with part 13, pawl 33 falls into the recess 37 of part 13. In the meantime, cam 30 has engaged cam 32 on pawl 34, this pawl thus being lifted upon further return of arm 11. The construction and arrangement of the various elements are such that pawl 33 falls into the recess 37 before pawl 34 is lifted by cam 30 on arm 11. This intermediate stage is shown in Fig. 4. The arm 14, released when pawl 34 was lifted upon further return of arm 11, will now perform, together with arm 16, a rotation in the direction shown by the arrow Z due to the tension of spring 45. The coupling wheel 4, which continued to mesh with the wheel 5, is thus again coupled with the input wheel 3, so that the position shown in Fig. 1 is restored and a driving coupling between the driving shaft 1 and the driven shaft 2 is again provided. The clamping rollers 41 are moved into their operative position simultaneously with the return movement of part 14, since the arms 39 release the member 15 and the latter moves the clamping rollers 41, due to the action of spring 44, towards the narrow portion of the space between the clamping blocks 43 and the cylindrical surfaces 42.

The pawls 33 and 34 ensure that the arm 16 invariably occupies a determined position. The coupling wheel 4 thus either meshes with the input wheel 3 or is moved completely out of mesh therewith, the transition from one position to the other taking place rapidly.

Figure 5:
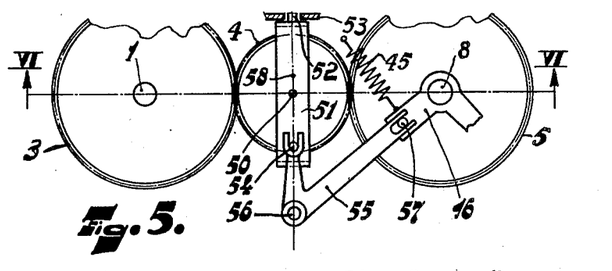
Figs. 5, 6, and 6a show in plan view and in partially sectional and partially elevation views details of an embodiment which differs from the mechanism shown in Figs. 1 to 4 in the manner of displacement of the coupling wheel.
Figure 6:
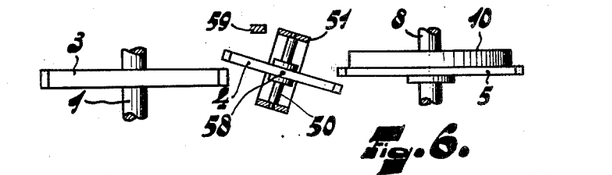
Figure 6A:
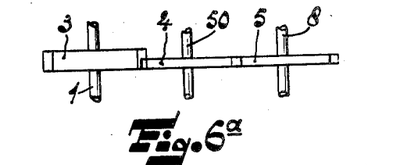

Figs. 5 and 6 show some details of a second embodiment of the clutch mechanism according to the invention which differs from that shown in Figs. 1 to 4 in regard to the manner of displacement of the coupling wheel. As shown in Fig. 6, the coupling wheel 4 is caused to disengage from the input wheel 5 by the coupling wheel 4 being tilted about an axis 58 extending through the centre of the coupling wheel 4 at right angles to the plane of the shafts of the wheels 3 and 5, which latter plane also comprises the shaft of the coupling wheel 4. The extremities of the shaft 50 of the coupling wheel 4 are supported in the horizontal parts of a rectangular frame 51, which is laterally provided with studs 52 (only one being shown) which are rotatably supported in stationary parts 53 of the clutch mechanism. Provided on the frame is a stud 54, which is embraced by the birfurcated extremity of a lever 55, which is rotatably supported at 56. The other extremity of the lever also has the shape of a bifurcation which embraces a stud 57 on the movable arm 16. In the normal operating state of the clutch mechanism, the frame 51 is held in the vertical position against a stop 59 (Fig. 6) by the action of the spring 45 upon arm 16, the coupling wheel 4 meshing with both the input wheel 3 and the intermediate wheel 5. In the manner described above with reference to Figs. 1 to 4, arm 16 is suddenly displaced upon overload on the driven shaft, the displacement of arm 16 being transferred by the lever 55 to the frame 51 so that the frame 51, together with the coupling wheel, is tilted about the axis 58. As may be seen from Fig. 6, the coupling wheel in this position does not mesh with either of the wheels 3 and 5. When the overload on the driven shaft is removed, the arm 16 is moved back in a manner similar to that described with reference to the mechanism shown in Figs. 1 to 4, with the result that the coupling wheel is tilted back and again meshes with the input wheel 3 and the intermediate wheel 5. In both Figures 6 and 6a the gear wheel 3 is shown to be considerably thicker than intermediate gear wheel 5, which has the same thickness as coupling wheel 4. In tilting the wheel 4 the wheel 5 is first released and when the tilting movement of wheel 4 is continued this wheel may also release wheel 3. This, however, is not necessary. In tilting back the wheel 4 this wheel engages first under spring pressure the wheel 3 so that meshing occurs. Thereafter, wheel 4 engages wheel 5, which at that moment is standing still, so that presently wheel 4 will mesh with wheel 5 and return entirely to its original position. The axis 58 about which the coupling wheel is adapted to tilt need not necessarily pass through the centre of the coupling wheel. As an alternative, the coupling wheel may be tilted about an axis passing through the points at which this wheel contacts with the intermediate wheel 5 so that the coupling wheel remains geared to the intermediate wheel and is only lifted away from the input wheel 3.

Figure 7:
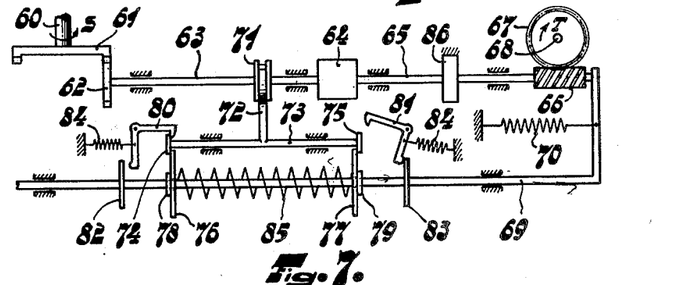
Figs. 7 and 8 are diagrammatic views of embodiments of the clutch mechanism according to the invention in which the master wheel and the output wheel comprise inclined teeth, the master wheel being adapted to be displaced in its axial direction, Fig. 7 showing one embodiment in which the coupling wheel which constitutes the controllable connection with the driving shaft is likewise adapted to be displaced in its axial direction, and Fig. 8 showing an embodiment in which the shaft of the coupling wheel is caused to swing in a transverse direction effecting engagement and disengagement of the clutch.
Figure 8:
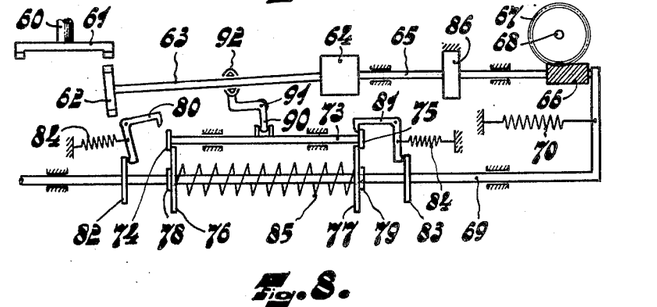

In the two further embodiments of the clutch mechanism shown in Figures 7 and 8, the intermediate member is constituted by the shaft of the master wheel which is slidable in its longitudinal direction. The two embodiments differ in the manner in which the coupling wheel is displaced.

In Fig. 7, a crown wheel 61 is rigidly secured to a driving shaft 60. In the normal operating state of the clutch mechanism (as shown), the input wheel 61 meshes with a coupling wheel 62 which is secured to a shaft 63 movable in its longitudinal direction. The shaft 63 is coupled by way of a coupling 64 to a shaft 65 of a master wheel 66, which shaft is likewise movable in its longitudinal direction. The coupling 64 is such that the shafts 63 and 65 may perform a relative longitudinal displacement without the driving coupling for rotation between these shafts being interrupted. This coupling may be made, for example, in the form of an eccentric stud on one shaft which co-operates with a catch on the other shaft.

The master wheel 66, which has inclined teeth and which may be, for example, a worm, co-operates with an output wheel 67, likewise having inclined teeth and secured to a driven shaft 68. When the shaft 60 is driven in the direction shown by the arrow S, the shaft 68 is driven in the direction shown by the arrow T. A sliding shaft 69, which is subject to the tension of a main spring 70, engages the straight end of shaft 65. Spring 70 keeps the shafts 65 and 69 in their normal operating positions against an abutment (not shown) by which the movement of the said shafts to the left is limited.

Provided on the shaft 63 is a disc 71 having a circular groove which accommodates the bifurcated extremity of an arm 72 of a further sliding shaft 73. The extremities of sliding shaft 73 are provided with stops 74 and 75 with which pawls 80 and 81 rotatable about fixed points can co-operate. The stops 74 and 75 furthermore co-operate with discs 76 and 77 loosely provided on the shaft 69 and urged under preliminary tension towards fixed abutments 78 and 79 on the shaft 69 by a spring 85 provided between the discs 76 and 77. Furthermore, the shaft 69 carries abutments 82 and 83 which are adapted to co-operate with and lift pawls 80 and 81, respectively, these pawls being urged towards their operative positions by springs 84.

Provided between the shaft 65 and a stationary part of the clutch mechanism is a coupling 86, which permits displacement of shaft 65 in both directions and rotation of this shaft in the normal sense of rotation, but which prevents rotation of this shaft in a sense opposite to that of the normal rotation which takes place when shaft 68 is driven by way of the clutch mechanism. Coupling 86 may be realised as a free-wheel coupling comprising clamping rollers or clamping balls. As an alternative, use may be made of a ratchet and ratchet-wheel coupling or a claw coupling in which for normal rotation the co-operating parts slide unhindered over one another. With normal load on the driven shaft 68, the state of the clutch mechanism is as shown in Fig. 7. However, if shaft 68 is overloaded, wheel 67 remains at rest, master wheel 66 screwing itself along this stationary wheel against the force of spring 70 to the right, thus displacing the sliding shaft 69 to the right. Since disc 76 is taken along by the stop 78 on shaft 69, while disc 77 engages the stop 75 on shaft 73, shaft 73 is subject to the tension of spring 85. However, shaft 73 is checked by pawl 80 until the coupled shafts 65 and 69 have moved to the right to such extent that pawl 80 is lifted by the stop 82. Shaft 73 is now free to move rapidly to the right under the action of spring 85 and during this movement takes along, by way of arm 72, the coupling-wheel shaft 63, so that coupling wheel 62 is disengaged from input wheel 61. During the movement of shaft 73 to the right, the stop 75 slides behind pawl 81 which has been released before by stop 83, so that the coupling wheel is locked in the disengaged position. After the coupling wheel 62 is disengaged, rotation of shaft 65 opposite to the sense of rotation followed prior to disengagement, hence screwing back of wheel 66, is prevented by coupling 86, so that spring 70 is stretched as long as wheel 67 is checked due to overload.

When the overload is removed, wheel 67 rotates under the action of spring 70 in the sense of rotation previously followed, master wheel 66 and shaft 65 thus moving to the left, that is to say moving back without rotating, which movement is, as mentioned above, not prevented by coupling 86. Upon this return, spring 85 is again stretched additionally since pawl 81 detains shaft 73 in the displaced position. It is not until shaft 69 has moved back sufficiently for pawl 81 to be lifted by stop 83, that shaft 73 returns by the action of spring 85 to its initial position, thus taking along by way of arm 72 the shaft 63. The coupling wheel 62 again meshes with the input wheel 61 and the normal operating state present before overload is thus restored.

Under unfavourable conditions it may occur that, due to the pressure between the teeth of the wheels 61 and 62, spring 85 fails to disengage the coupling wheel from the input wheel, although pawl 80 is lifted. In order that complete disengagement by the clutch mechanism may then be effected, coupling 64 may be such that the shafts 63 and 65 can move relatively in their longitudinal direction only a determined free distance, so that in the event of spring 85, after pawl 80 has been lifted, not moving the coupling wheel out of engagement, shaft 65 itself takes along the shaft of the coupling wheel. In case of a stud with catch coupling between the shaft 63 and 65, the stud may for this purpose be provided with a cam which is ultimately engaged by the catch upon longitudinal displacement of shaft 65.

Figure 7A:
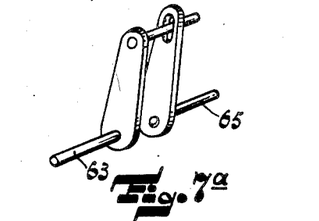
Fig. 7a shows a perspective view of the preferred coupling between shafts 63 and 65.

In Fig. 7a axial movement of shaft 63 with respect to shaft 65 is permitted by use of an axially extending, eccentrically-arranged stud 63 which is slidable in a slot of a catch member secured to the shaft 65. It is to be understood, however, that the coupling between the shafts 63 and 65 may also take the form of a loose spline coupling.

In the embodiment shown in Fig. 8, the coupling wheel 62 is caused to engage or disengage the input wheel by swinging the coupling-wheel shaft 63 in a direction transverse to its longitudinal direction. The mechanism is otherwise identical with that shown in Fig. 7. Identical parts are therefore indicated by the same reference numerals.

The coupling-wheel shaft 63 is swung by means of a lever 90, pivotable about a fixed point 91, of which one extremity embraces, with the use of a hinge 92, the coupling-wheel shaft 63 and the other co-operates with a fork on the shaft 73, which is adapted to be displaced rapidly by spring 85. The mechanism is shown in the switched-off position, the shaft 68 having been overloaded. Owing to the displacement of shaft 73 to the right, the lever 90 has turned from the normal position to the left so that the coupling wheel has become disengaged from the input wheel. The coupling 64 between the coupling-wheel shaft 63 and the slidable shaft 65 of the master wheel 67 must be such as to permit shaft 63 to swing and may be, for example, either a flexible coupling having two resilient rings or a cardan coupling.

What we claim is:

1. An automatic overload release clutch mechanism comprising: an input wheel, an output wheel, and a master wheel; means mounting said master wheel in displaceable relationship with regard to said output wheel but in constant meshing engagement therewith; means biasing said mounting means to return said master wheel to a normal undisplaced relationship with regard to said output wheel; coupling means for drivingly connecting said input wheel to said master wheel, said coupling means comprising an element mounted for movement to alternate positions in and out of engagement with said input wheel; a member mounted for pivotal movement being controlled by said master wheel and operatively connected to said coupling element, said member being responsive to the displacement of said master wheel for determining which of said two positions said coupling element occupies; said coupling means also comprising means for preventing rotation of said master wheel in the direction opposite to that normally followed thereby prior to overload.

2. An automatic overload release clutch mechanism comprising: an input wheel, an output wheel, and a master wheel; means mounting said master wheel in displaceable relationship with regard to said output wheel but in constant meshing engagement therewith; means biasing said mounting means to return said master wheel to a normal undisplaced relationship with regard to said output wheel, said biasing means comprising a spring connected to said mounting means and to a stationary part on said mechanism; coupling means for drivingly connecting said input wheel to said master wheel, said coupling means comprising an element mounted for movement to alternate positions in and out of engagement with said input wheel; a follower member mounted for pivotal movement being controlled by said master wheel and operatively connected to said coupling element, said member being responsive to the displacement of said master wheel for determining which of said two positions said coupling element occupies; said coupling means also comprising means for preventing rotation of said master wheel in the direction opposite to that normally followed thereby prior to overload.

3. An automatic overload release clutch mechanism comprising: an input wheel, an output wheel, and a master wheel; means mounting said master wheel in displaceable relationship with regard to said output wheel but in constant meshing engagement therewith; means biasing said mounting means to return said master wheel to a normal undisplaced relationship with regard to said output wheel, said biasing means comprising a spring connected to said mounting means and to a stationary part on said mechanism, and means for adjusting the relative position of said stationary part on said mechanism; coupling means for drivingly connecting said input wheel to said master wheel, said coupling means comprising an element mounted for movement to alternate positions in and out of operative engagement with said input wheel; a member mounted for pivotal movement being controlled by said master wheel and operatively connected to said coupling element, said member being responsive to the displacement of said master wheel for determining which of said two positions said coupling element occupies; said coupling means also comprising means for preventing rotation of said master wheel in the direction opposite to that normally followed thereby prior to overload.

4. An automatic overload release clutch mechanism comprising: an input wheel, an output wheel, and a master wheel; means mounting said master wheel in displaceable relationship with regard to said output wheel but in constant meshing engagement therewith; means biasing said mounting means to return said master wheel to a normal undisplaced relationship with regard to said output wheel; coupling means for drivingly connecting said input wheel to said master wheel, said coupling means comprising an element mounted for movement to alternate positions in and out of engagement with said input wheel; a member mounted for pivotal movement being controlled by said master wheel and operatively connected to said coupling element, said member being responsive to the displacement of said master wheel for determining which of said two positions said coupling element occupies, said last named means comprising means for causing a retardation of position determination upon response to displacement; said coupling means also comprising means for preventing rotation of said master wheel in the direction opposite to that normally followed thereby prior to overload.

5. An automatic overload release clutch mechanism comprising: an input wheel, an output wheel, and a master wheel; means mounting said master wheel in displaceable relationship with regard to said output wheel but in constant meshing engagement therewith; means biasing said mounting means to return said master wheel to a normal undisplaced relationship with regard to said output wheel; coupling means for drivingly connecting said input wheel to said master wheel, said coupling means comprising a wheel having a serrated peripheral edge, said wheel being mounted for movement to alternate positions in and out of engagement with said input wheel; a member mounted for pivotal movement being controlled by said master wheel and operatively connected to said coupling element, said member being responsive to the displacement of said master wheel for determining which of said two positions said coupling wheel occupies; said coupling means also comprising means for preventing rotation of said master wheel in the direction opposite to that normally followed thereby prior to overload.

6. An automatic overload release clutch mechanism comprising: an input wheel, an output wheel, and a master wheel; means mounting said master wheel in displaceable relationship with regard to said output wheel but in constant meshing engagement therewith; means biasing said mounting means to return said master wheel to a normal undisplaced relationship with regard to said output wheel; coupling means for drivingly connecting said input wheel to said master wheel, said coupling means comprising a wheel mounted for movement to alternate positions in and out of engagement with said input wheel, and an intermediate wheel mounted on a shaft and in constant meshing engagement with said coupling wheel and said master wheel said mounting means for said master wheel being displaceable in a direction transversely of the direction of said shaft; a member mounted for pivotal movement being controlled by said master wheel and operatively connected to said coupling element, said member being responsive to the displacement of said master wheel for determining which of said two positions said coupling wheel occupies; said coupling means also comprising means for preventing rotation of said master wheel in the direction opposite to that normally followed thereby prior to overload.

7. An automatic overload release clutch mechanism comprising: an input wheel, an output wheel, and a master wheel; means mounting said master wheel in displaceable relationship with regard to said output wheel but in constant meshing engagement therewith; means biasing said mounting means to return said master wheel to a normal undisplaced relationship with regard to said output wheel; coupling means for drivingly connecting said input wheel to said master wheel, said coupling means comprising a wheel mounted for movement to alternate positions in and out of engagement with said input wheel, and an intermediate wheel mounted on a shaft and in constant meshing engagement with said coupling wheel and said master wheel; said mounting means for said master wheel being displaceable in a direction transversely of the direction of said shaft, said mounting means for said master wheel being pivotally mounted on said shaft; a member mounted for pivotal movement being controlled by said master wheel and operatively connected to said coupling element, said member being responsive to the displacement of said master wheel for determining which of said two positions said coupling wheel occupies; said coupling means also comprising means for preventing rotation of said master wheel in the direction opposite to that normally followed thereby prior to overload.

8. An automatic overload release clutch mechanism comprising: an input wheel, an output wheel, and a master wheel; means mounting said master wheel in displaceable relationship with regard to said output wheel but in constant meshing engagement therewith; means biasing said mounting means to return said master wheel to a normal undisplaced relationship with regard to said output wheel; coupling means for drivingly connecting said input wheel to said master wheel, said coupling means comprising a movable element having a shaft, a coupling wheel, means mounting said coupling wheel on said shaft of the movable element for movement to alternate positions in and out of engagement with said input wheel; said movable element being displaceable in a direction transversely of the direction of said shaft of said intermediate wheel; a member mounted for pivotal movement being controlled by said master wheel and operatively connected to said coupling element, said member being responsive to the displacement of said master wheel for determining which of said two positions said coupling wheel occupies; said coupling means also comprising means for preventing rotation of said master wheel in the direction opposite to that normally followed thereby prior to overload.

9. An automatic overload release clutch mechanism comprising: an input wheel, an output wheel, and a master wheel; means mounting said master wheel in displaceable relationship with regard to said output wheel but in constant meshing engagement therewith; means biasing said mounting means to return said master wheel to a normal undisplaced relationship with regard to said output wheel; coupling means for drivingly connecting said input wheel to said master wheel, said coupling means comprising a movable element, a first shaft, a coupling wheel, means mounting said coupling wheel on said first shaft of the wheel mounted by a shaft on a movable element for movement to alternate positions in and out of engagement with said input wheel; a second shaft, an intermediate wheel mounted on said second shaft and in constant meshing engagement with said coupling wheel and said master wheel, said movable element being displaceable in a direction transversely of the direction of said shaft of said intermediate wheel; said movable element being pivotally mounted on said shaft of said intermediate wheel; a member mounted for pivotal movement being controlled by said master wheel and operatively connected to said coupling element, said member being responsive to the displacement of said master wheel for determining which of said two positions said coupling wheel occupies; said coupling means also comprising means for preventing rotation of said master wheel in the direction opposite to that normally followed thereby prior to overload.

10. An automatic overload release clutch mechanism comprising: an input wheel, an output wheel, and a master wheel; means mounting said master wheel in displaceable relationship with regard to said output wheel but in constant meshing engagement therewith; means biasing said mounting means to return said master wheel to a normal undisplaced relationship with regard to said output wheel; coupling means for drivingly connecting said input wheel to said master wheel, said coupling means comprising a wheel mounted on a shaft for tilting movement to alternate positions in and out of engagement with said input wheel; a member mounted for pivotal movement being controlled by said master wheel and operatively connected to said coupling element, said member being responsive to the displacement of said master wheel for determining which of said two positions said coupling wheel occupies; said coupling means also comprising means for preventing rotation of said master wheel in the direction opposite to that normally followed thereby prior to overload.

11. An automatic overload release clutch mechanism comprising: an input wheel, an output wheel, and a master wheel; said output and master wheels each having inclined gear teeth; means including a shaft mounting said master wheel in displaceable relationship with regard to said output wheel in the direction of said shaft but in constant meshing engagement therewith; means biasing said mounting means to return said master wheel to a normal undisplaced relationship with regard to said output wheel; coupling means for drivingly connecting said input wheel to said master wheel, said coupling means comprising an element mounted for movement to alternate positions in and out of engagement with said input wheel; a member mounted for pivotal movement being controlled by said master wheel and operatively connected to said coupling element, said member being responsive to the displacement of said master wheel for determining which of said two positions said coupling element occupies; said coupling means also comprising means for preventing rotation of said master wheel in the direction opposite to that normally followed thereby prior to overload.

12. An automatic overload release clutch mechanism comprising: an input wheel, an output wheel, and a master wheel; means mounting said master wheel in displaceable relationship with regard to said output wheel but in constant meshing engagement therewith; means biasing said mounting means to return said master wheel to a normal undisplaced relationship with regard to said output wheel; coupling means for drivingly connecting said input wheel to said master wheel, said coupling means comprising a wheel mounted on a shaft for movement in the direction of said shaft to alternate positions in and out of engagement with said input wheel; a member mounted for pivotal movement being controlled by said master wheel and operatively connected to said coupling element, said member being responsive to the displacement of said master wheel for determining which of said two positions said coupling wheel occupies; said coupling means also comprising means for preventing rotation of said master wheel in the direction opposite to that normally followed thereby prior to overload.

13. An automatic overload release clutch mechanism comprising: an input wheel, an output wheel, and a master wheel; means including a shaft mounting said master wheel in displaceable relationship with regard to said output wheel in the direction of said shaft but in constant meshing engagement therewith; means biasing said mounting means to return said master wheel to a normal undisplaced relationship with regard to said output wheel; coupling means for drivingly connecting said input wheel to said master wheel, said coupling means comprising a wheel mounted on a shaft pivotally coupled to said master wheel shaft for movement to alternate positions in and out of engagement with said input wheel; a member mounted for pivotal movement being controlled by said master wheel and operatively connected to said coupling element, said member being responsive to the displacement of said master wheel for determining which of said two positions said coupling element wheel occupies; said coupling means also comprising means for preventing rotation of said master wheel in the direction opposite to that normally followed thereby prior to overload.

14. An automatic overload release clutch mechanism comprising: an input wheel, an output wheel, and a master wheel; means mounting said master wheel in displaceable relationship with regard to said output wheel but in constant meshing engagement therewith; means biasing said mounting means to return said master wheel to a normal undisplaced relationship with regard to said output wheel; coupling means for drivingly connecting said input wheel to said master wheel, said coupling means comprising an element mounted for movement to alternate positions in and out of engagement with said input wheel; a member mounted for pivotal movement being controlled by said master wheel and operatively connected to said coupling element, said member being responsive to the displacement of said master wheel for determining which of said two positions said coupling element occupies; said retardation means comprising pawl means for preventing return of said coupling element into engagement with said input wheel until said master wheel is in said normal undisplaced relationship with regard to said output wheel; said coupling means also comprising means for preventing rotation of said master wheel in the direction opposite to that normally followed thereby prior to overload.

15. An automatic overload release clutch mechanism comprising: an input wheel, an output wheel, and a master wheel; means mounting said master wheel in displaceable relationship with regard to said output wheel but in constant meshing engagement therewith; means biasing said mounting means to return said master wheel to a normal undisplaced relationship with regard to said output wheel; follower means including a movable member connected to said mounting means by means of a spring, pawl means for initially holding said movable member against following said mounting means upon limited displacement thereof, means for rendering said pawl means inoperative when said limited displacement is exceeded; coupling means for drivingly connecting said input wheel to said master wheel, said coupling means comprising an element mounted for movement to alternate positions in and out of engagement with said input wheel; and said follower means being finally responsive to the relative displacement of said master wheel for determining which of said two positions said coupling element occupies; said coupling means also comprising means for preventing rotation of said master wheel in the direction opposite to that normally followed thereby prior to overload.

16. An automatic overload release clutch mechanism comprising: an input wheel, an output wheel, and a master wheel; means mounting said master wheel in displaceable relationship with regard to said output wheel but in constant meshing engagement therewith; means biasing said mounting means to return said master wheel to a normal undisplaced relationship with regard to said output wheel; means for holding said mounting means against said biasing action; coupling means for drivingly connecting said input wheel to said master wheel, said coupling means comprising an element mounted for movement to alternate positions in and out of engagement with said input wheel; a member mounted for pivotal movement being controlled by said master wheel and operatively connected to said coupling element, said member being responsive to the displacement of said master wheel for determining which of said two positions said coupling element occupies; said coupling means also comprising means for preventing rotation of said master wheel in the direction opposite to that normally followed thereby prior to overload; and means responsive to the disengaged position of said coupling element for rendering said holding means inoperative.

17. An automatic overload release clutch mechanism comprising: an input wheel, an output wheel, and a master wheel; means mounting said master wheel in displaceable relationship with regard to said output wheel but in constant meshing engagement therewith; means biasing said mounting means to return said master wheel to a normal undisplaced relationship with regard to said output wheel; means for holding said mounting means against said biasing action; said holding means comprising an automatically operating one-way brake having at least one movable coupling body; coupling means for drivingly connecting said input wheel to said master wheel, said coupling means comprising an element mounted for movement to alternate positions in and out of engagement with said input wheel; and cam means operating to render said movable coupling body inoperative when said coupling element is in disengaged position; a member mounted for pivotal movement being controlled by said master wheel and operatively connected to said coupling element, said member being responsive to the displacement of said master wheel for determining which of said two positions said coupling element occupies; said coupling means also comprising means for preventing rotation of said master wheel in the direction opposite to that normally followed thereby prior to overload; and means responsive to the disengaged position of said coupling element for rendering said holding means inoperative.

18. An automatic overload release clutch mechanism comprising: an input wheel, an output wheel, and a master wheel; means mounting said master wheel in displaceable relationship with regard to said output wheel but in constant meshing engagement therewith; means biasing said mounting means to return said master wheel to a normal undisplaced relationship with regard to said output wheel; coupling means for drivingly connecting said input wheel to said master wheel, said coupling means comprising an element mounted for movement to alternate positions in and out of engagement with said input wheel; a member mounted for pivotal movement being controlled by said master wheel and operatively connected to said coupling element, said member being responsive to the displacement of said master wheel for determining which of said two positions said coupling element occupies; an electrical contact means for opening and closing in response to said positions of said coupling element; said coupling means also comprising means for preventing rotation of said master wheel in the direction opposite to that normally followed thereby prior to overload.

19. An automatic overload release clutch mechanism comprising: an input wheel, an output wheel, and a master wheel; means mounting said master wheel in displaceable relationship with regard to said output wheel but in constant meshing engagement therewith; means biasing said mounting means to return said master wheel to a normal undisplaced relationship with regard to said output wheel; coupling means for drivingly connecting said input wheel to said master wheel, said coupling means comprising an element mounted for movement to alternate positions in and out of engagement with said input wheel; a member mounted for pivotal movement being controlled by said master wheel and operatively connected to said coupling element, said member being responsive to the displacement of said master wheel for determining which of said two positions said coupling element occupies; said coupling means also comprising means for preventing rotation of said master wheel in the direction opposite to that normally followed thereby prior to overload, said last named means comprising an automatically operative one-way brake between a stationary part of said mechanism and a rotary part which is coupled to said master wheel.

References Cited in the file of this patent

UNITED STATES PATENTS

| Number | Name | Date |
|---|---|---|
| 1,186,188 | Hely | June 6, 1916 |
| 1,759,874 | Stearns | May 27, 1930 |
| 2,151,493 | Acker | Mar. 21, 1939 |
| 2,554,969 | Williams | May 29, 1951 |
| 2,578,533 | Garrahan, Jr. | Dec. 11, 1951 |

FOREIGN PATENTS

| Number | Country | Date |
|---|---|---|
| 66,926 | Denmark | May 31, 1948 |
| 298,760 | Italy | July 14, 1932 |